United States Patent
Shinya

(10) Patent No.: US 12,517,383 B2
(45) Date of Patent: Jan. 6, 2026

(54) METHOD FOR CONTROLLING DISPLAY DEVICE SWITCHABLE BETWEEN A TRANSPARENT STATE AND AN OPAQUE STATE, AND DISPLAY DEVICE

(71) Applicant: Panasonic Intellectual Property Management Co., Ltd., Osaka (JP)

(72) Inventor: Takeichi Shinya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 709 days.

(21) Appl. No.: 17/794,522

(22) PCT Filed: May 19, 2021

(86) PCT No.: PCT/JP2021/018940
§ 371 (c)(1),
(2) Date: Jul. 21, 2022

(87) PCT Pub. No.: WO2021/235474
PCT Pub. Date: Nov. 25, 2021

(65) Prior Publication Data
US 2023/0052038 A1 Feb. 16, 2023

(30) Foreign Application Priority Data
May 22, 2020 (JP) .................... 2020-089868

(51) Int. Cl.
G09G 3/36 (2006.01)
G02F 1/01 (2006.01)
G02F 1/169 (2019.01)

(52) U.S. Cl.
CPC ............ *G02F 1/0121* (2013.01); *G02F 1/169* (2019.01)

(58) Field of Classification Search
CPC ......... G02F 1/0121; G09G 3/36; G09G 3/344
See application file for complete search history.

(56) References Cited

U.S. PATENT DOCUMENTS

| 11,424,223 B2 * | 8/2022 | Deckers ............ H10H 20/8583 |
| 2008/0049467 A1 | 2/2008 | Takayanagi |

(Continued)

FOREIGN PATENT DOCUMENTS

| CN | 110268307 A | 9/2019 |
| JP | 2008-035633 A | 2/2008 |

(Continued)

OTHER PUBLICATIONS

International Search Report issued on Aug. 17, 2021 in International Patent Application No. PCT/JP2021/018940.

(Continued)

*Primary Examiner* — Sanghyuk Park
(74) *Attorney, Agent, or Firm* — Rimon P.C.

(57) ABSTRACT

A method of controlling a display device is a method for controlling a display device including a light modulation sheet switchable between a transparent state and an opaque state. When an operation to turn on the display device is obtained, a PWM waveform for generating an alternating voltage based on a direct voltage is output, the alternating voltage having a duty cycle of 50% at a phase of 0 degrees or 180 degrees, the alternating voltage is generated from the direct voltage, based on the PWM waveform output, and the alternating voltage generated is output to the light modulation sheet.

10 Claims, 8 Drawing Sheets

(56) References Cited

U.S. PATENT DOCUMENTS

| | | | |
|---|---|---|---|
| 2010/0265282 A1* | 10/2010 | Ide | G09G 3/3692 |
| | | | 345/691 |
| 2019/0353945 A1 | 11/2019 | Takahashi | |
| 2020/0033655 A1* | 1/2020 | Hirayama | E06B 9/24 |
| 2020/0211487 A1* | 7/2020 | Lee | G02F 1/133514 |

FOREIGN PATENT DOCUMENTS

| | | |
|---|---|---|
| JP | 2009-229946 A | 10/2009 |
| JP | 2018-018727 A | 2/2018 |
| JP | 2019-120736 A | 7/2019 |

OTHER PUBLICATIONS

Chinese Office Action dated Mar. 28, 2025 issued in the corresponding Chinese Patent Application No. 202180011001.4, with English translation of the Search Report.

\* cited by examiner

METHOD FOR CONTROLLING DISPLAY DEVICE SWITCHABLE BETWEEN A TRANSPARENT STATE AND AN OPAQUE STATE, AND DISPLAY DEVICE

CROSS-REFERENCE OF RELATED APPLICATIONS

This application is the U.S. National Phase under 35 U.S.C. § 371 of International Patent Application No. PCT/JP2021/018940, filed on May 19, 2021 which in turn claims the benefit of Japanese Patent Application No. 2020-089868, filed on May 22, 2020, the entire disclosures of which Applications are incorporated by reference herein.

TECHNICAL FIELD

The present disclosure relates to a method for controlling a display device, and a display device.

BACKGROUND ART

Light modulation sheets each including a pair of transparent electrode substrates and a liquid crystal layer held therebetween are known in the related art (see Patent Literature (PTL) 1). Such light modulation sheets are configured to be switchable between a transparent state and an opaque state (e.g., cloudy state) by turning on/off the alternating voltage applied across the transparent electrodes.

CITATION LIST

Patent Literature

[PTL 1] Japanese Unexamined Patent Application Publication No. 2009-229946

SUMMARY OF INVENTION

Technical Problem

The alternating voltage applied to the light modulation sheet is fed from a commercial power supply, for example. In this case, the phase of the alternating voltage when the operation of the light modulation sheet is started cannot be controlled. For this reason, the inrush current corresponding to the phase of the alternating voltage may be generated when the operation of the light modulation sheet is started, and may flow through the light modulation sheet. Repeated generation of such an inrush current may break electrode portions of the light modulation sheet, obstructing normal operation of switching between the display states.

Thus, an object of the present disclosure is to provide a method for controlling a display device, the method enabling suppression of an inrush current in a light modulation sheet, and a display device.

Solution to Problem

To achieve the above object, one aspect according to the method for controlling a display device according to the present disclosure is a method for controlling a display device including a light modulation sheet switchable between a transparent state and an opaque state, the method including outputting a pulse width modulation (PWM) waveform for generating an alternating voltage based on a direct voltage, when obtaining a first operation to turn on the display device, the alternating voltage having a duty cycle of 50% at a phase of 0 degrees or 180 degrees; generating the alternating voltage from the direct voltage, based on the PWM waveform output; and outputting the alternating voltage generated to the light modulation sheet.

To achieve the above object, the display device according to one aspect of the present disclosure is a display device including a light modulation sheet switchable between a transparent state and an opaque state; a microcomputer which outputs a PWM waveform for generating an alternating voltage based on a direct voltage when obtaining an operation to turn on the display device, the alternating voltage having a duty cycle of 50% at a phase of 0 degrees or 180 degrees; and a drive circuit which generates the alternating voltage from the direct voltage based on the PWM waveform output, and outputs the alternating voltage generated to the light modulation sheet.

Advantageous Effects of Invention

The method for controlling a display device according to one aspect of the present disclosure can suppress an inrush current in a light modulation sheet.

DESCRIPTION OF EMBODIMENTS (History Leading to the Present Disclosure)

Figure 1:
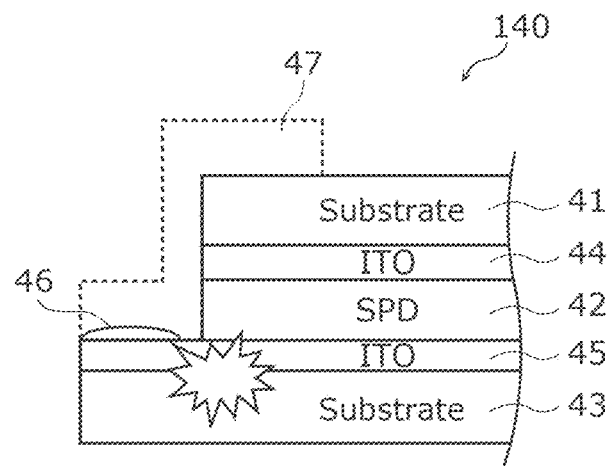
FIG. 1 is a diagram illustrating a cross-sectional structure of the light modulation sheet according to Comparative Example.

Prior to the description of the embodiment according to the present disclosure, underlying knowledge forming the basis of the present disclosure will be described. FIG. 1 is a diagram illustrating a cross-sectional structure of light modulation sheet 140 according to Comparative Example. In FIG. 1, hatching is omitted.

As illustrated in FIG. 1, light modulation sheet 140 includes substrates 41 and 43, indium oxide tin (ITO) films 44 and 45 (ITOs in FIG. 1) disposed on surfaces of substrates 41 and 43 opposite to each other, and light modulation layer 42 (suspended particle device (SPD) in FIG. 1) disposed inside ITO films 44 and 45. Light modulation sheet 140 is configured to be capable of controlling the transmittance of incident light. It is sufficient that light modulation sheet 140 is capable of controlling the transmittance of incident light, and may be a device called a light blocking shutter, a light transmitting shutter, or a light damping device. Light modulation sheet 140 in use is overlaid on a display transparent to light, for example. The display transparent to light is a transparent display such as a transparent organic light emitting diode (OLED) panel, for example. Although a transparent display is overlaid on the side of substrate 41 of light modulation sheet 140 in the following description, light modulation sheet 140 and the transparent display can be arranged in any other relation.

Substrates 41 and 43 are made of a material transparent to light. Substrates 41 and 43 are a polyethylene terephthalate (PET) film, for example, and may be a glass substrate or an acrylic substrate.

Light modulation layer 42 is formed with a resin and a light modulating suspension dispersed therein. The light modulating suspension contains light modulating particles reactive to the electric field. Although details will be described later, light modulation sheet 140 controls the light transmittance using the polarization orientation of the light modulating particles.

ITO films 44 and 45 form a capacitor in light modulation sheet 140. ITO films 44 and 45 are made of a transparent electrode material such as a metal oxide such as ITO, for example. ITO films 44 and 45 are electrically connected to a commercial power supply. In light modulation sheet 140 according to Comparative Example, a conductive tape (e.g., Cu foil tape) for feeding an alternating voltage to light modulation sheet 140 is bonded to ITO film 45 with conductive paste 46 (e.g., silver paste). A portion of ITO film 45 and the conductive tape bonded with conductive paste 46 and its surroundings are also referred to as electrode portion. The electrode portion is not used for display in light modulation sheet 140. In FIG. 1, the conductive tape is not illustrated (see conductive tape 90 in FIG. 6). Conductive paste 46 is one example of an electrode.

ITO films 44 and 45 are one example of transparent electrodes. The transparent electrodes are not limited to ITO films 44 and 45, and can be any electrically conductive layer which is transparent to light.

Sealing Tape 47 is a protective tape which covers the electrode portion of light modulation sheet 140. For example, sealing tape 47 is applied to cover part of substrate 41 and the electrode portion.

Next, two display states of light modulation sheet 140, i.e., the opaque state and the transparent state will be described. Although an example in which light modulation sheet 140 transits between two display states will be described below, any other configuration can be used. For example, at least one of the opaque state and the transparent state may include a plurality of states having different transmittances.

In light modulation sheet 140, application of a voltage across ITO films 44 and 45 generates an electric field in light modulation layer 42, and the light modulating particles are polarized and aligned in a direction parallel to the electric field. As a result, incident light passes through light modulation layer 42. In other words, application of a voltage brings light modulation sheet 140 into a transparent state where incident light is transmitted. In other words, light modulation sheet 140 is in a highly transmissive state with a high transmittance. In this state, when light modulation sheet 140 is viewed from one side (e.g., substrate 41 side) of light modulation sheet 140 toward the other side (e.g., substrate 43 side) thereof, an object (e.g., an exhibit) disposed in the other side of light modulation sheet 140 can be seen.

Moreover, in the state where an electric field is not generated in light modulation layer 42 without applying a voltage across ITO films 44 and 45, light modulation sheet 140 absorbs, scatters, or reflects light due to Brownian motion of the light modulating particles dispersed in the light modulating suspension. As a result, incident light is blocked by light modulation layer 42. In other words, when a voltage is not applied, light modulation sheet 140 is in the opaque state, in which incident light is more difficult to transmit than in the transparent state. In other words, light modulation sheet 140 is in a slightly transmissive state with a transmittance lower than that of the highly transmissive state. In this state, when light modulation sheet 140 is viewed from one side (e.g., substrate 41 side) of light modulation sheet 140 toward the other side thereof (e.g., substrate 43 side), an object disposed on the other side of light modulation sheet 140 cannot be seen. By performing display on the transparent display in this state, an user can see a video on the transparent display.

It is sufficient that the opaque state is a state with a transmittance lower than that of the transparent state.

Figure 2:
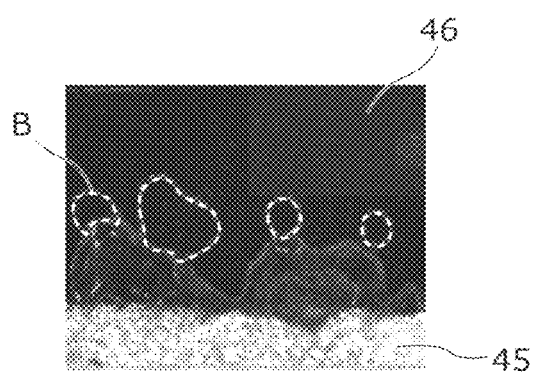
FIG. 2 is a diagram illustrating a state where voids are generated in the light modulation sheet according to Comparative Example.

Light modulation sheet 140 having such a configuration is in the transparent state when an alternating voltage is fed, and is in the opaque state when the alternating voltage is not fed from a commercial power supply. However, when on/off of feed of the alternating voltage from the commercial power supply is switched, the phase of the alternating voltage at this time cannot be controlled. For this reason, a large current may be generated, and a current beyond the allowable current value of light modulation sheet 140 may flow. For example, the inrush current flowing through the capacitor is increased when light modulation sheet 140 is turned on while the alternating voltage is at a phase of 90 degrees or 270 degrees (at the maximum voltage), because ITO films 44 and 45 constituting light modulation sheet 140 form a capacitor. This may result in degradation of the drive circuit or electrode material of light modulation sheet 140, a reduction in reliability, and thus occurrence of abnormal operation. FIG. 2 is a diagram illustrating a state where voids B are generated in light modulation sheet 140 according to Comparative Example.

As illustrated in FIG. 2, voids B are generated between ITO film 45 and conductive paste 46. It is inferred that voids B are generated due to heat generated by the inrush current. This heat causes sparking of voids B, which causes spark breakdown, and finally breakage of the electrode portion.

Thus, the present inventors have conducted extensive research on a method for controlling a display device including a light modulation sheet, the method enabling suppression of an inrush current in the light modulation sheet included in the display device when feed of electric power to the light modulation sheet is turned on/off, and have devised a method for controlling a display device and the like described below.

Hereinafter, an embodiment will be specifically described with reference to the drawings. The embodiment described below all illustrate comprehensive or specific examples. Numeric values, shapes, materials, components, arrangement positions of the components, connection forms thereof, steps, order of steps, and the like shown in the embodiment below are exemplary, and should not be construed as limitations to the present disclosure. Moreover, among the components of the embodiment below, the components not described in an independent claim will be described as optional components.

The drawings are schematic views, and are not always exact illustrations. In the drawings, identical reference signs will be given to substantially identical configurations, and the overlapping descriptions may be omitted or simplified in some cases.

In this specification, terms indicating the relation between entities, such as "equal", numeric values, and numeric value ranges are expressions not only meaning substantial identical ranges but also involving a different of about several percent, for example, rather than expressions indicating only strict meanings.

Embodiment

Hereinafter, display device 10 according to the present embodiment will be described with reference to FIGS. 3 to 11.

1. Configuration of Display Device

First, the configuration of display device 10 according to the present embodiment will be described with reference to FIGS. 3 to 9.

Figure 3:
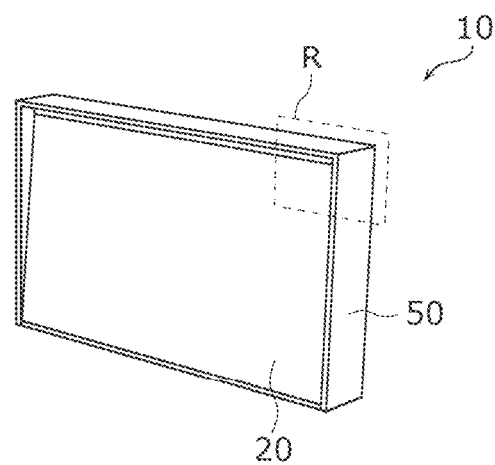
FIG. 3 is a perspective view illustrating an appearance of the display device according to an embodiment.
Figure 4:
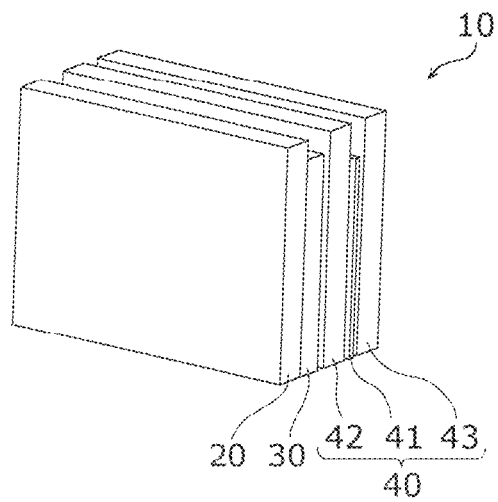
FIG. 4 is a perspective view illustrating a configuration of the display device according to the embodiment.
Figure 5:
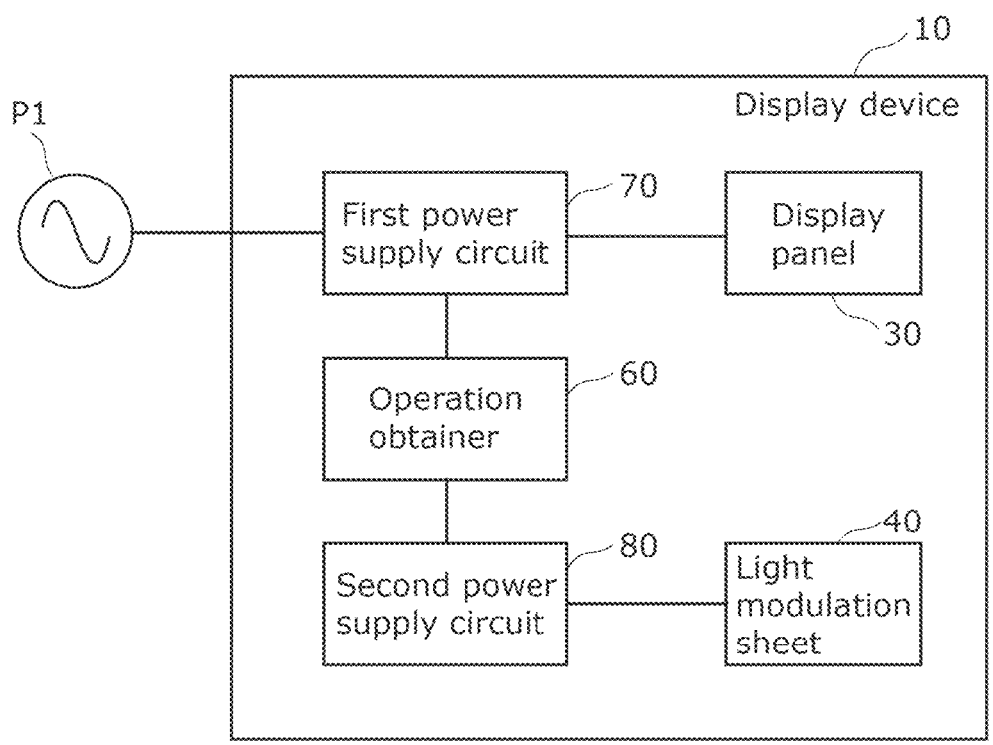
FIG. 5 is a block diagram illustrating a functional configuration of the display device according to the embodiment.

FIG. 3 is a perspective view illustrating an appearance of display device 10 according to the present embodiment. FIG. 4 is a perspective view illustrating the configuration of display device 10 according to the present embodiment. FIG. 4 is an enlarged diagram of dashed line region R in FIG. 3, where frame portion 50 is not illustrated. FIG. 5 is a block diagram illustrating the functional configuration of display device 10 according to the present embodiment.

As illustrated in FIGS. 3 to 5, display device 10 includes reinforcing plate 20, display panel 30, light modulation sheet 40, frame portion 50, operation obtainer 60, first power supply circuit 70, and second power supply circuit 80. Display device 10 includes reinforcing plate 20, display panel 30, and light modulation sheet 40 bonded in this order. Reinforcing plate 20 side corresponds to the front surface side. For example, a user sees display device 10 from reinforcing plate 20 side. Display panel 30 side corresponds to the rear surface side. When an object (e.g., an exhibit) is disposed behind display panel 30, the user can see the object in the transparent state of light modulation sheet 40. These components are bonded with an adhesive member having high transparency, such as an optical clear adhesive (OCA).

Reinforcing plate 20 is a cover member which is disposed on the front surface side of display panel 30 and covers display panel 30 and the like. Reinforcing plate 20 is made of a material transparent to light, and is made of reinforcing glass, for example. This is not an essential configuration for reinforcing plate 20, and another configuration may be used in which display panel 30 is bent to support display panel 30 due to its tension, for example.

Display panel 30 is a display transparent to light, and is a transparent OLED panel, for example. Display panel 30 operates in response to a voltage fed from first power supply circuit 70. Display panel 30 performs displaying in the opaque state of light modulation sheet 40.

Light modulation sheet 40 is a sheet member which is disposed on the rear surface side of display panel 30 and is switchable between the transparent state and the opaque state. For example, light modulation sheet 40 is in the transparent state when an alternating voltage is fed, and is in the opaque state when the alternating voltage is not fed.

Light modulation sheet 40 may have a configuration similar to that of light modulation sheet 140 according to Comparative Example, and the description thereof will be omitted.

Although an example in which light modulation sheet 40 is a sheet member which modulates the light transmittance by the SPD method has been described above, any other configuration can be used. It is sufficient that light modulation sheet 40 is transparent to light and is configured to be capable of modulating the transmittance depending on whether the alternating voltage is applied or not (for example, depending on the presence/absence of an electric field). Light modulation sheet 40 may be a sheet member which modulates the light transmittance by an electrochromic (EC) method, or may be a sheet member which modulates the light transmittance by a polymer dispersed liquid crystal (PDLC) method.

Although details will be described later, the alternating voltage is not directly fed from commercial power supply P1 to light modulation sheet 40 according to the present embodiment.

Figure 6:
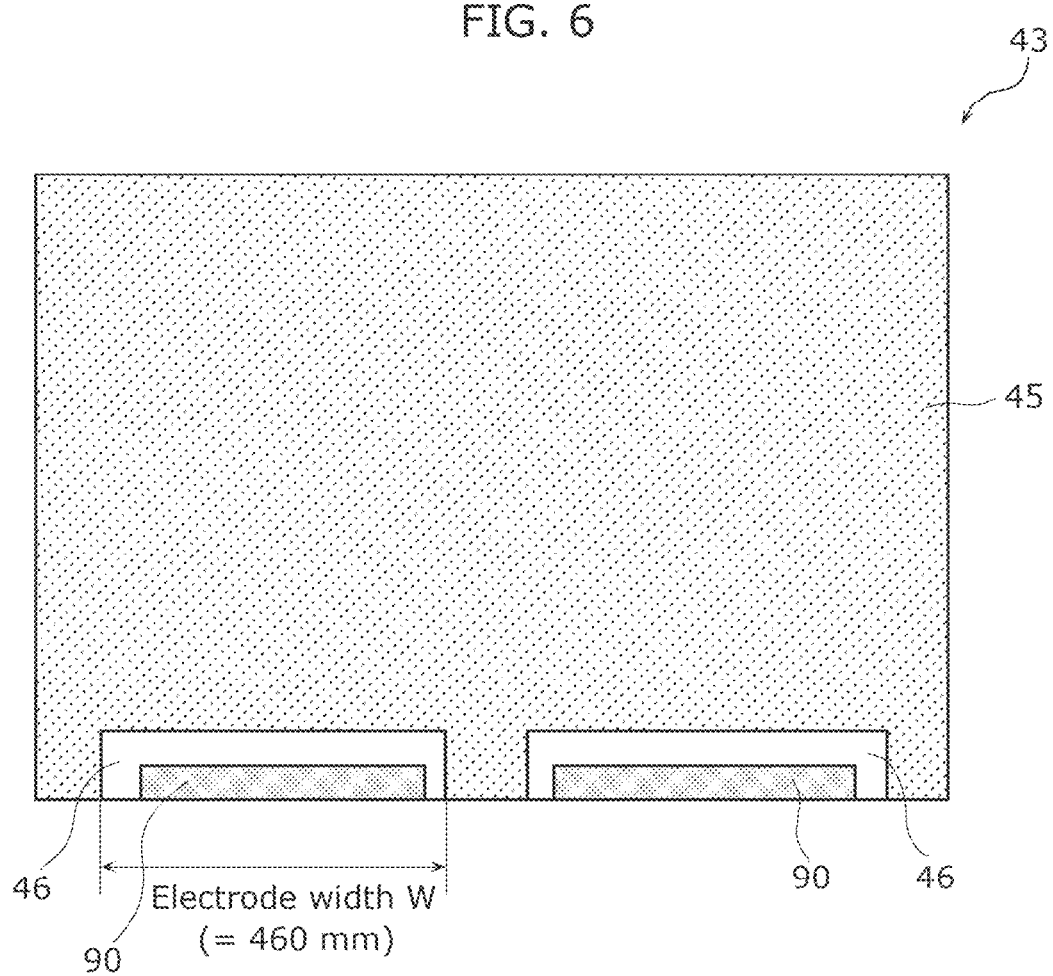
FIG. 6 is a diagram illustrating an electrode configuration of the light modulation sheet according to the embodiment.

Here, the configuration of the electrode portion in light modulation sheet 40 will be described with reference to FIGS. 6 and 7. FIG. 6 is a diagram illustrating the configuration of the electrode portion of light modulation sheet 40 according to the present embodiment.

As illustrated in FIG. 6, ITO film 45 is disposed on the surface of substrate 43, and conductive paste 46 is applied onto ITO film 45. Conductive paste 46 is a silver paste, for example, and is applied by printing or the like. Above conductive paste 46, conductive tape 90 for connecting ITO film 45 to second power supply circuit 80 is connected.

One of two conductive pastes 46 is electrically connected to ITO film 45, and the other thereof is electrically connected to ITO film 44 included in substrate 41. Thereby, light modulation sheet 40 constitutes a capacitor. The other of two conductive pastes 46 may be disposed in substrate 41.

Here, the width of conductive paste 46 (electrode width W in FIG. 6) will be described with reference to FIG. 7. FIG. 7 is a diagram illustrating the relation between electrode width W and the current density in light modulation sheet 40 according to the present embodiment.

Figure 7:
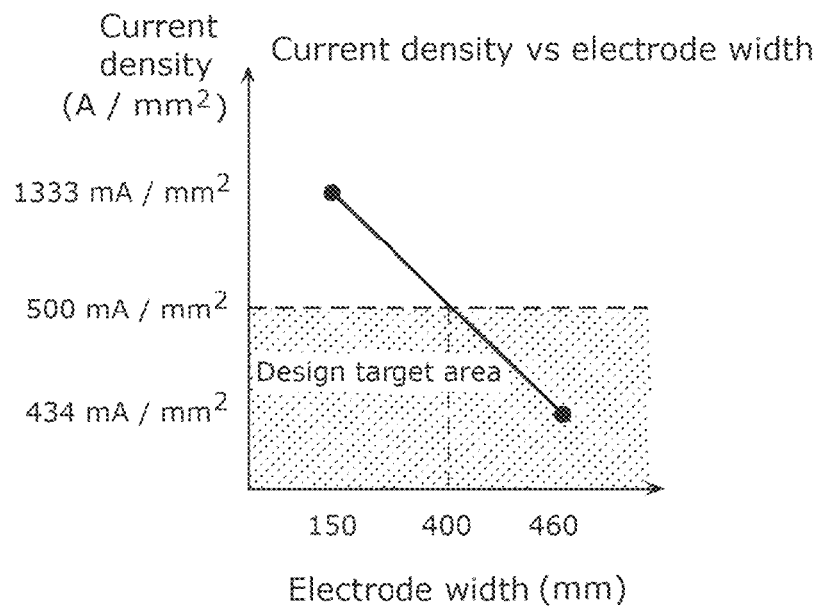
FIG. 7 is a diagram illustrating the relation between the electrode width and the current density in the light modulation sheet according to the embodiment.

As illustrated in FIG. 7, it is preferred that the current density of conductive paste 46 be 500 mA/mm$^2$ or less (see Design target area in FIG. 7). In other words, it is preferred that the maximum value of the current density of the inrush current be 500 mA/mm$^2$ or less. Control of the current density to 500 mA/mm$^2$ or less can suppress breakage of the electrode portion of light modulation sheet 40 even when an inrush current of 200 mA flows.

When the inrush current is 200 mA and electrode width W is 150 mm, the current density is 1333 mA/mm$^2$. When the inrush current is 200 mA and electrode width W is 460 mm, the current density is 434 mA/mm$^2$. When the inrush current is 500 mA/mm$^2$, electrode width W is 400 mm. In other words, it is preferred that electrode width W be 400 mm or more. Electrode width W may be 460 mm.

Electrode width W can be any other value than 400 mm or more. It is sufficient that electrode width W is a width which can ensure the connection reliability of ITO film 45 and conductive paste 46, and may be 150 mm, for example.

Again with reference to FIG. 3, frame portion 50 is a frame body which surrounds lateral surfaces of display device 10. In other words, frame portion 50 surrounds surfaces other than the front surface and the rear surface of display device 10. In such a configuration, display device 10 enables the user to see an object (e.g., an exhibit) disposed on the rear surface side of display device 10, when light modulation sheet 40 is in the transparent state.

Again with reference to FIG. 5, operation obtainer 60 obtains an operation of display device 10 from user. For example, operation obtainer 60 may obtain a signal corresponding to the operation by the user from a mobile terminal, such as a smartphone, or a dedicated remote controller through communication. In this case, operation obtainer 60 includes a communication circuit. Alternatively, operation obtainer 60 may be a press button or the like disposed in display device 10. Alternatively, operation obtainer 60 may obtain the operation by the user, based on a voice or a gesture. In this case, operation obtainer 60 may include a communication circuit, or may include a microphone or a camera. Operation obtainer 60 which obtains an operation from the user through communication will be described below.

First power supply circuit 70 feeds electric power for operating display panel 30. First power supply circuit 70 is connected to commercial power supply P1 and display panel 30 to convert an alternating voltage from commercial power supply P1 to a desired direct voltage and to feed the direct voltage to display panel 30. It can also be said that first power supply circuit 70 feeds electric power based on commercial power supply P1 to display panel 30. When operation obtainer 60 obtains a signal for starting display on display device 10, first power supply circuit 70 starts feed of the direct voltage to display panel 30. When operation obtainer 60 obtains a signal for stopping display device 10, first power supply circuit 70 stops feed of the direct voltage to display panel 30.

To be noted, first power supply circuit 70 does not feed electric power to light modulation sheet 40. As described above, display device 10 has a configuration in which electric power is not directly fed from commercial power supply P1 to light modulation sheet 40.

First power supply circuit 70 includes an A/D converter which converts an alternating voltage to a desired direct voltage, and a controller which controls the operation of the A/D converter.

Second power supply circuit 80 feeds electric power for operating light modulation sheet 40. Second power supply circuit 80 is connected to light modulation sheet 40 to convert a direct voltage to a desired alternating voltage and to feed the alternating voltage to light modulation sheet 40. It can also be said that second power supply circuit 80 feeds electric power based on a power supply different from commercial power supply P1 to light modulation sheet 40. When operation obtainer 60 obtains a signal for starting display on display device 10, second power supply circuit 80 starts feed of the alternating voltage to light modulation sheet 40. When operation obtainer 60 obtains a signal for stopping display on display device 10, second power supply circuit 80 stops feed of the alternating voltage to light modulation sheet 40.

Figure 8:
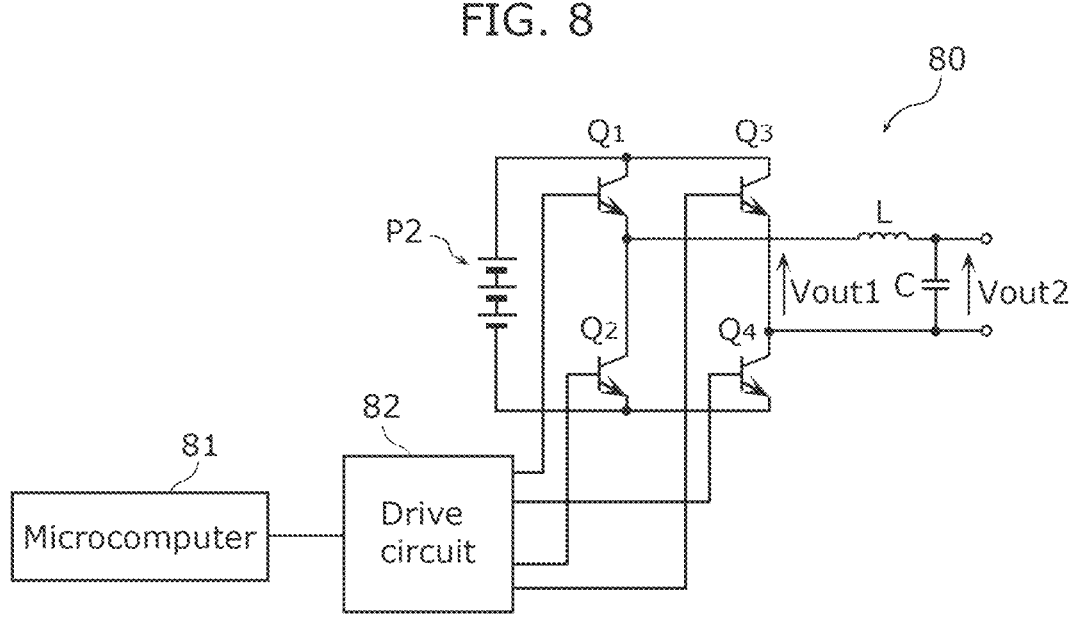
FIG. 8 is a circuit diagram illustrating a second power supply circuit according to the embodiment.

Here, second power supply circuit 80 will be further described with reference to FIG. 8. FIG. 8 is a circuit diagram illustrating second power supply circuit 80 according to the present embodiment. The circuit diagram in FIG. 8 is one example, and any other configuration can be used.

As illustrated in FIG. 8, second power supply circuit 80 includes microcomputer 81, drive circuit 82, DC power supply P2, transistors Q1 to Q4, and a low-pass filter (such as inductor L and capacitor C).

Microcomputer 81 controls output of the alternating voltage to light modulation sheet 40. When operation obtainer 60 obtains a signal for starting display on display device 10, microcomputer 81 outputs, to drive circuit 82, a PWM (pulse width modulation) waveform for generating an alternating waveform from the direct voltage fed from DC power supply P2, the alternating waveform having a duty cycle of 50% at a phase of 0 degrees or 180 degrees. The voltage value at a phase of 0 degrees or 180 degrees of the alternating voltage generated based on this PWM waveform is zero volt (0 V). The term "zero volt" is intended to include not only exactly zero volt but also voltages which can be recognized as substantially zero volt. Zero volt includes a voltage which is 5% or less of the maximum voltage of the alternating voltage fed to light modulation sheet 40, for example. The term "phase of 0 degrees or 180 degrees" is also intended to include not only exactly 0 degrees or 180 degrees but also phases which can be recognized as substantially 0 degrees or 180 degrees. For example, the term includes a deviation of the phase corresponding to the voltage which is 5% or less of the maximum voltage of the alternating voltage fed to light modulation sheet 40.

In the present embodiment, the PWM waveform is generated by microcomputer 81 including a built-in timer circuit. Microcomputer 81 receives an input of the digital signal obtained by converting the analog waveform (e.g., sine waveform) of the target alternating voltage by the A/D converter. The timer circuit generates a PWM signal, based on the digital signal. For example, the PWM signal is preliminarily generated, and is stored in a storage (not illustrated). Microcomputer 81 is one example of a digital circuit. The digital circuit is one example of a PWM waveform outputter.

Compared to generation of the PWM waveform by an analog circuit, generation of the PWM waveform by the digital circuit enables more precise control of the phase (0 degrees or 180 degrees) of the alternating voltage fed to light modulation sheet 40 when light modulation sheet 40 is turned on. The digital circuit is not limited to microcomputer 81, and may be implemented with a field programmable gate array (FPGA) including a built-in timer circuit, for example. The FPGA is programmable after manufacturing of LSI.

Drive circuit 82 controls turning on and off of transistors Q1 to Q4, based on the PWM waveform output from microcomputer 81. During a positive half cycle of the PWM waveform output from microcomputer 81, drive circuit 82 outputs the direct voltage of DC power supply P2 (hereinafter, also referred to as direct voltage E) by turning on transistors Q1 and Q4 at the same time. In a negative half cycle of the PWM waveform output from microcomputer 81, drive circuit 82 outputs direct voltage −E by turning on transistors Q2 and Q3 at the same time. Output voltage Vout1 is a series of pulses including direct voltages E and −E.

For example, drive circuit 82 is implemented with a logic circuit which outputs one of a first signal for turning on transistors Q1 and Q4 at the same time and a second signal for turning on transistors Q2 and Q3 at the same time, based on the PWM waveform; a first drive circuit which turns on transistors Q1 and Q4 when the first signal is output; and a second drive circuit which turns on transistors Q2 and Q3 when the second signal is output.

DC power supply P2 is a power supply for feeding the alternating voltage to light modulation sheet 40. For example, direct voltage E of DC power supply P2 is 350 V, but not limited thereto. Direct voltage E may be a voltage allowing switching on/off of light modulation sheet 40.

Second power supply circuit 80 including DC power supply P2 enables feed of the alternating voltage having any voltage value to light modulation sheet 40. The voltage value of the alternating voltage fed to light modulation sheet 40 can be varied depending on the specification of light modulation sheet 40. Accordingly, because second power supply circuit 80 includes DC power supply P2, the alternating voltage having a voltage value according to light modulation sheet 40 can be fed irrespective of the specification of light modulation sheet 40. For example, DC power supply P2 is a power supply independent of commercial power supply P1. In other words, DC power supply P2 is not electrically connected to commercial power supply P1, for example.

As above, light modulation sheet 40 may be controlled to one or more intermediate states between the transparent state and the opaque state. It can also be said that light modulation sheet 40 is switchable to one or more intermediate states between the transparent state and the opaque state. An intermediate state indicates a state of light modulation sheet 40 having a transmittance between the transmittance in the transparent state and that in the opaque state. For example, light modulation sheet 40 is controlled to any transmittance by receiving feed of the alternating voltage having any voltage value from second pouter supply circuit 80.

Display panel 30 displays a video in the one or more intermediate states, but any other configuration can be used. Display panel 30 may not display a video in at least one intermediate state among the one or more intermediate states.

Alternatively, commercial power supply P1 (alternating current) can be converted to a direct voltage, and using the PWM waveform, the alternating voltage to be fed to light modulation sheet 40 can be generated from the direct voltage after conversion. In this case, however, the voltage value of the direct voltage depends on the voltage value of commercial power supply P1. For this reason, a transformer or the like is needed to provide a voltage value according to the specification of light modulation sheet 40, thus increasing the size of the display device. In the present embodiment, because DC power supply P2 is used, an increase in size of display device 10 can be suppressed, and a desired alternating voltage to light modulation sheet 40 can be fed.

DC power supply P2 is built in display device 10, for example, or may be disposed outside display device 10.

The electric power based on DC power supply P2 is not fed to display panel 30, for example.

Transistors Q1 to Q4 are switching transistors of which turn on/off is controlled by drive circuit 82. Each of transistors Q1 to Q4 to be used may be any known transistor.

The low-pass filter is disposed to output an alternating voltage having a sine wave with reduced distortion, and is configured with inductor L and capacitor C in the present embodiment. In second power supply circuit 80, output voltage Vout2 (alternating voltage) having reduced distortion can be obtained by passing output voltage Vout1 through the low-pass filter. Output voltage Vout2 is then fed to light modulation sheet 40. The low-pass filter can have any other configuration than that including inductor L and capacitor C. Any known low-pass filter may be used as long as it can reduce the distortion of output voltage Vout2.

Thus, in the present embodiment, the alternating voltage of commercial power supply P1 is not directly fed to light modulation sheet 40. An alternating voltage having a controlled phase when on/off of feed of the alternating voltage is switched is fed to light modulation sheet 40.

The circuit configuration illustrated in FIG. 8 is one example, and any known circuit configuration can be used as long as the alternating voltage can be generated based on the PWM waveform output from microcomputer 81 and the direct voltage from DC power supply P2. Moreover, for second power supply circuit 80, an example in which the PWM waveform is output by the digital circuit has been described. Any other configuration can be used. The PWM waveform may be output by an analog circuit. The PWM waveform may be an output of a comparator, which is obtained by inputting the analog waveform (e.g., sine waveform) of the target alternating voltage and a modulated wave (e.g., sawtooth wave) to the comparator (voltage comparator), for example. The analog circuit is one example of a PWM waveform outputter.

Figure 9:
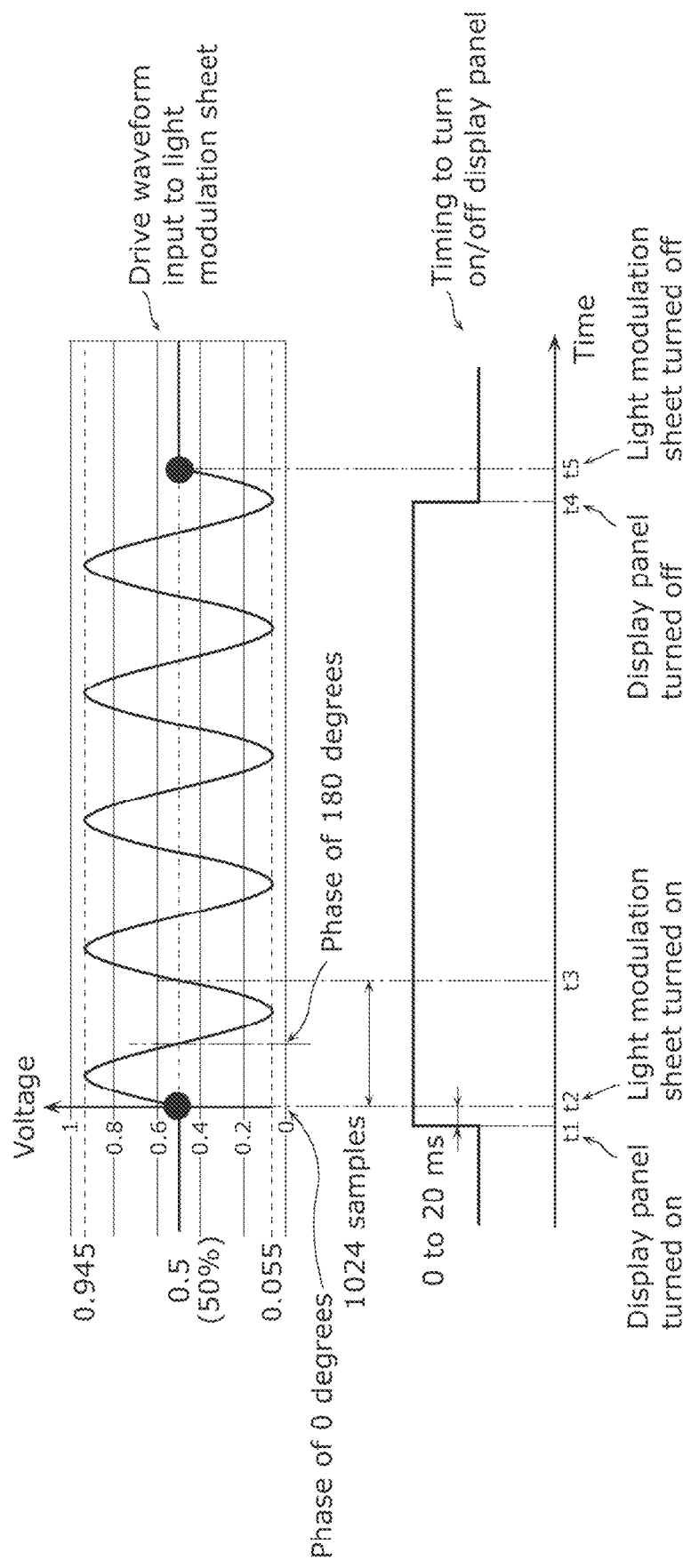
FIG. 9 is a diagram illustrating the waveform of the alternating voltage fed to the light modulation sheet according to the embodiment.

Here, output voltage Vout2 output from second power supply circuit 80 to light modulation sheet 40 will be described with reference to FIG. 9. FIG. 9 is a diagram illustrating the waveform (drive waveform) of the alternating voltage fed to light modulation sheet 40 according to the present embodiment. FIG. 9 shows the drive waveform input to light modulation sheet 40 and the on/off timing of display panel 30. Assume that at time t1, operation obtainer 60 obtains an operation to turn on display device 10, and at time t4, operation obtainer 60 obtains an operation to turn off display device 10. In FIG. 9, the abscissa represents the time, and the ordinate represents the voltage. In FIG. 9, the drive waveform input to light modulation sheet 40 is represented by a normalized voltage. Voltage "1" represents the maximum voltage on the plus side, and voltage "0" represents the maximum voltage on the minus side.

As illustrated in FIG. 9, at time t1, when operation obtainer 60 obtains the operation to turn on display device 10, the direct voltage is fed from first power supply circuit 70 to display panel 30. Thereby, display panel 30 can display a video.

Next, at time t2, feed of the alternating voltage to light modulation sheet 40 from second power supply circuit 80 is started in response to the operation to turn on display device 10, which is obtained at time t1. Thereby, light modulation sheet 40 transits from the transparent state to the opaque state.

Thus, in response to the operation to turn on display device 10, first power supply circuit 70 and second power supply circuit 80 may start feed of the voltage at different timings. For example, the timing to start feed of the alternating voltage from second power supply circuit 80 to light modulation sheet 40 may be later than the timing to start feed of the direct voltage from first power supply circuit 70 to display panel 30. In other words, feed of the alternating voltage may be started in light modulation sheet 40 after feed of the direct voltage to display panel 30 is started in response to the operation to turn on display device 10.

The interval between time t1 and t2 is about 0 to 20 ms, for example, but not limited thereto. Any other interval can be set. Time from t2 to t3 represents one cycle of the drive waveform input to light modulation sheet 40. One cycle is generated based on 1024 pieces of voltage data (output voltage Vout1), for example. Times t2 and t3 are times at which the phase in the drive waveform is 0 degrees. The time in the middle between times t2 and t3 is a time at which the phase in the drive waveform is 180 degrees. In FIG. 9, the feed is started from a phase of 0 degrees at time t2, but not limited thereto. The feed may be started from a phase of 180 degrees.

Here, at time t2, the drive waveform input to light modulation sheet 40 starts from a voltage of "0.5". This is one example of the alternating voltage having a duty cycle of 50% at a phase of 0 degrees or 180 degrees. The voltage of "0.5", i.e., the voltage having a duty cycle of 50% is zero volt. Because the drive waveform starts from zero volt as described above, the inrush current generated when light modulation sheet 40 is turned on can be suppressed. When the PWM waveform is generated by microcomputer 81, the phase of 0 degrees or 180 degrees can be precisely controlled, and thus, the inrush current can be further suppressed.

Next, at time t4, when operation obtainer 60 obtains the operation to turn off display device 10, feed of the direct voltage from first power supply circuit 70 to display panel 30 is stopped. Thereby, display panel 30 is turned off.

Next, at time t5, feed of the alternating voltage from second power supply circuit 80 to light modulation sheet 40 is stopped in response to the operation to turn off display device 10, which is obtained at time t4. As above, in response to the operation to turn off display device 10, first power supply circuit 70 and second power supply circuit 80 may stop feed of the voltage at different timings. For example, the timing to stop feed of the alternating voltage from second power supply circuit 80 to light modulation sheet 40 may be later than the timing to stop feed of the direct voltage from first power supply circuit 70 to display panel 30. In other words, feed of the alternating voltage may be stopped in light modulation sheet 40 after feed of the direct voltage to display panel 30 is stopped in response to the operation to turn off display device 10.

At and after time t4, second power supply circuit 80 stops feed of the electric power to light modulation sheet 40 at a time when the drive waveform reaches zero volt. For example, second power supply circuit 80 stops feed of the electric power to light modulation sheet 40 at a time (time t5 shown in FIG. 9) when the drive waveform first reaches zero volt after time t4. Because feed of the electric power is stopped when the drive waveform reaches zero volt as above, discharge current generated when turning off light modulation sheet 40 can be suppressed. When the PWM waveform is generated by microcomputer 81, the phase of 0 degrees or 180 degrees can be precisely controlled, and thus, the discharge current can be further suppressed. A reduction in reliability of light modulation sheet 40 can be further suppressed by suppressing the discharge current.

By feeding such an alternating voltage every time when light modulation sheet 40 is turned on, the amount of the inrush current generated every time when light modulation sheet 40 is turned on can be controlled to be substantially constant. In contrast, when the alternating voltage is directly fed to light modulation sheet 40 from commercial power supply P1, the phase cannot be controlled, which results in different amounts of the inrush current generated every time when light modulation sheet 40 is turned on. For example, when feed of the alternating voltage to light modulation sheet 40 is started at a phase of 90 degrees or 270 degrees (at the largest voltage), a large inrush current is generated. For example, when feed of the alternating voltage to light modulation sheet 40 is started at a phase of 0 degrees or 180 degrees (at the smallest voltage), a small inrush current is generated. As above, when the alternating voltage is directly fed to light modulation sheet 40 from commercial power supply P1, different amounts of inrush currents are generated every time when light modulation sheet 40 is turned on. This leads to different timings of breakage of the electrodes among display devices.

In FIG. 9, feed of the alternating voltage is stopped at a phase of 180 degrees at time t5, but not limited thereto. Feed of the alternating voltage may be stopped at a phase of 0 degrees.

Turning off of light modulation sheet 40 at a phase of 0 degrees or 180 degrees (that is, turning off thereof at zero volt) is not an essential configuration. For example, at time t4, second power supply circuit 80 may stop feed of the alternating voltage to light modulation sheet 40.

2. Operation of Display Device

Figure 10:
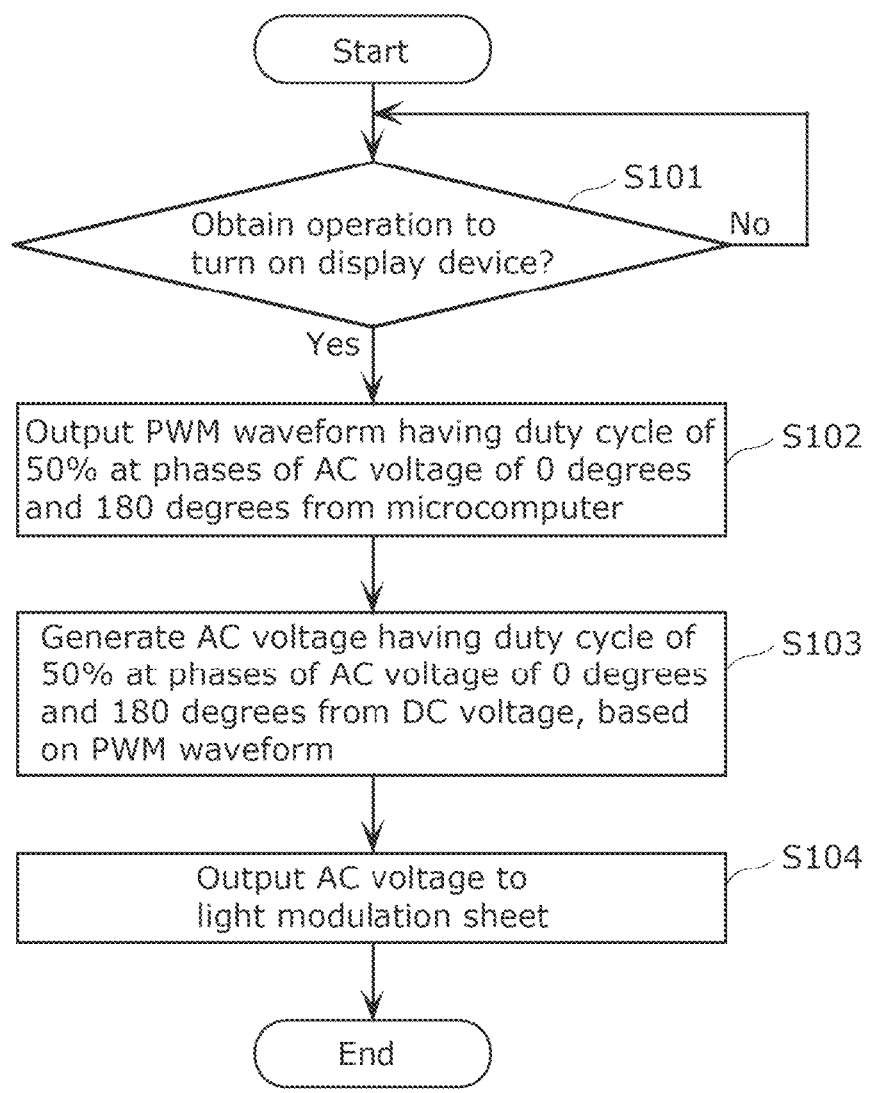
FIG. 10 is a flowchart illustrating the operation to turn on the display device according to the embodiment.

Subsequently, the operation of display device 10 according to the present embodiment will be described with reference to FIGS. 10 and 11. First, the operation to turn on display device 10 will be described with reference to FIG. 10. FIG. 10 is a flowchart illustrating the operation when display device 10 according to the present embodiment is turned on. Specifically, FIG. 10 is a flowchart illustrating the operation to turn on light modulation sheet 40.

As illustrated in FIG. 10, when operation obtainer 60 obtains the operation to turn on display device 10 (Yes in S101), microcomputer 81 in second power supply circuit 80 outputs a PWM waveform having a duty cycle of 50% at phases of the alternating voltage of 0 degrees and 180 degrees (S102). In other words, microcomputer 81 outputs a PWM waveform for providing a duty cycle of 50% at phases of the alternating voltage of 0 degrees and 180 degrees. It can also be said that microcomputer 81 outputs a PWM waveform for providing a voltage which is zero volt at phases of the alternating voltage of 0 degrees and 180 degrees. Microcomputer 81 outputs the PWM waveform by reading out a program from a storage (not illustrated), the program being generated to enable output of such a PWM waveform. For example, microcomputer 81 may start reading out the PWM waveform stored in the storage from a position of the PWM waveform at which the duty cycle is 50% at phases of the alternating voltage of 0 degrees and 180 degrees fed from second power supply circuit 80 to light modulation sheet 40. In the present embodiment, the starting position of the PWM waveform read by microcomputer 81 is intentionally set to the above-mentioned position.

Next, drive circuit 82 controls transistors Q1 to Q4 in order to generate an alternating voltage from direct voltage E of DC power supply P2, based on the PWM waveform of microcomputer 81, the alternating voltage having a duty cycle of 50% at phases of 0 degrees and 180 degrees (S103). Thereby, output voltage Vout1 illustrated in FIG. 9 is generated.

Next, output voltage Vout1 generated in step S103 passes through the low-pass filter, thereby generating output voltage Vout2, which has an AC waveform having reduced distortion, and then output voltage Vout2 is output to light modulation sheet 40 as the alternating voltage (S104). Thereby, feed of the alternating voltage illustrated in FIG. 9 to light modulation sheet 40 is started.

Feed of the direct voltage to display panel 30 by first power supply circuit 70 is performed during steps S101 to S103.

When operation obtainer 60 does not obtain the operation to turn on display device 10 (No in S101), microcomputer 81 in second power supply circuit 80 does not output the PWM waveform. Thereby, the signal for turning on transistors Q1 to Q4 is not output from drive circuit 82, and thus, transistors Q1 to Q4 are in the off states. In other words, because the alternating voltage is not fed from second power supply circuit 80 to light modulation sheet 40, light modulation sheet 40 remains in the transparent state.

Next, the operation to turn off display device 10 will be described with reference to FIG. 11. FIG. 11 is a flowchart illustrating the operation when display device 10 according to the present embodiment is turned off. Specifically, FIG. 11 is a flowchart illustrating the operation to turn off light modulation sheet 40.

Figure 11:
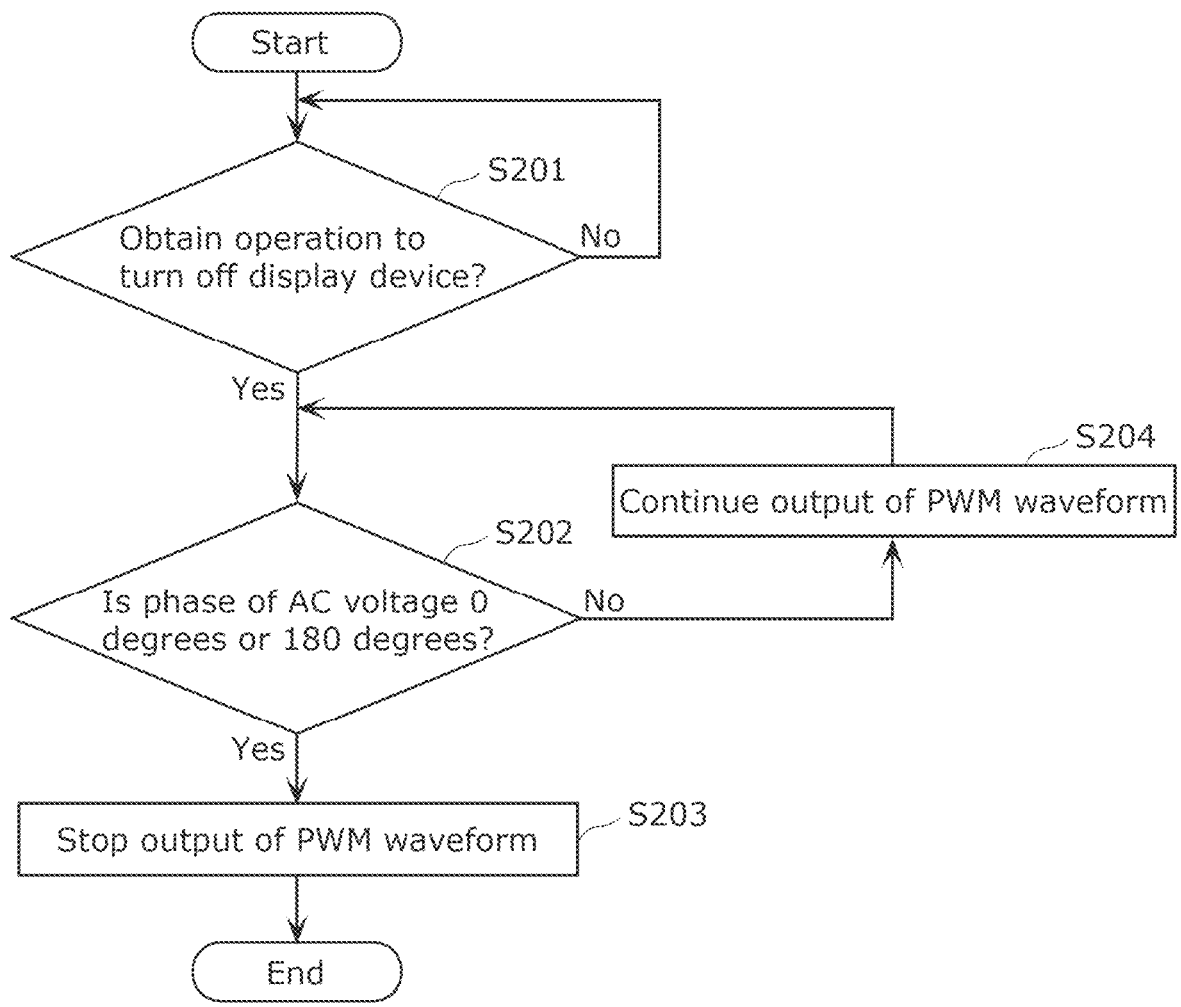
FIG. 11 is a flowchart illustrating the operation to turn off the display device according to the embodiment.

As illustrated in FIG. 11, when operation obtainer 60 obtains the operation to turn off display device 10 (Yes in S201), microcomputer 81 included in second power supply circuit 80 determines whether the current phase of the alternating voltage is 0 degrees or 180 degrees (S202). For example, microcomputer 81 may perform determination step S202, based on the waveform of the PWM signal output at present.

When the phase of the alternating voltage is 0 degrees or 180 degrees (Yes in S202), microcomputer 81 stops output of the PWM waveform (S203). Thereby, as illustrated in FIG. 9, feed of the alternating voltage to light modulation sheet 40 is stopped when the phase of the alternating voltage is 0 degrees or 180 degrees. Stop of feed of the direct voltage to display panel 30 by first power supply circuit 70 is performed during steps S201 to S203, for example.

When the phase of the alternating voltage is not 0 degrees or 180 degrees (No in S202), microcomputer 81 continues output of the PWM waveform (S204). In other words, microcomputer 81 continues output of the PWM waveform until the phase of the alternating voltage reaches 0 degrees or 180 degrees. It can also be said that microcomputer 81 continues output of the PWM waveform from the time in step S201 to the time when the alternating voltage reaches zero volt. Thus, even when operation obtainer 60 obtains the operation to turn off display device 10, microcomputer 81 does not stop output of the PWM waveform until the phase of the alternating voltage reaches 0 degrees or 180 degrees, that is, until the alternating voltage reaches zero volt.

When operation obtainer 60 does not obtain the operation to turn off display device 10 (No in S201), microcomputer 81 included in second power supply circuit 80 returns to step S201, and continues output of the PWM waveform until the operation to turn off display device 10 is obtained. Thereby, feed of the alternating voltage from second power supply circuit 80 to light modulation sheet 40 is continued, and thus light modulation sheet 40 remains in the opaque state.

Display device 10 may perform at least the operation illustrated in FIG. 10 among the operations illustrated in FIGS. 10 and 11.

3. Effects

As described above, the method of controlling display device 10 according to the present embodiment is a method of controlling display device 10 including light modulation sheet 40 switchable between the transparent state and the opaque state. When the operation to turn on display device 10 is obtained (Yes in S101), the PWM waveform for generating an alternating voltage based on the direct voltage is output, the alternating voltage having a duty cycle of 50% at a phase of 0 degrees or 180 degrees (S102); and the alternating voltage is generated from the direct voltage, based on the PWM waveform output (S103), and the alternating voltage generated is output to light modulation sheet 40 (S104).

Thereby, the alternating voltage having a duty cycle of 50% at a phase of 0 degrees or 180 degrees is fed to light modulation sheet 40. By starting feed of the alternating voltage to light modulation sheet 40 at the timing when the phase of the alternating voltage is 0 degrees or 180 degrees, the peak current of the inrush current when feed of the alternating current to light modulation sheet 40 is started can be suppressed. Thus, the inrush current in light modulation sheet 40 can be suppressed. The expression "to suppress the inrush current" indicates suppression of the peak current of the inrush current, for example, and may indicate a reduction in the number of times of generation of the inrush current.

Moreover, display device 10 includes microcomputer 81 which controls the alternating voltage applied to light modulation sheet 40, and the PWM waveform is output from microcomputer 81.

Thereby, the alternating voltage at 0 degrees or 180 degrees can be more precisely controlled than in the case where the PWM waveform is generated using an analog circuit. Thus, the inrush current to light modulation sheet 40 can be further suppressed.

Moreover, display device 10 includes display panel 30 transparent to light, display panel 30 being disposed to be overlaid on light modulation sheet 40. In the method of controlling display device 10, after feed of the direct voltage to display panel 30 in response to the operation to turn on display device 10 is started, feed of the alternating voltage to light modulation sheet 40 in response to the operation is started.

Thereby, the phase (0 degrees or 180 degrees) of the alternating voltage when turning on light modulation sheet 40 can be more precisely controlled. Thus, the inrush current to light modulation sheet 40 can be further suppressed.

Moreover, when the operation to turn off display device 10 is obtained (Yes in S201), feed of the direct voltage to display panel 30 is stopped in response to the operation, and then feed of the alternating voltage to light modulation sheet 40 is stopped in response to the operation.

Thereby, the phase of the alternating voltage when turning off light modulation sheet 40 can be controlled to 0 degrees or 180 degrees (e.g., the phase at which the alternating voltage reaches zero volt), compared to the case where feed of the alternating voltage is stopped at a timing at which feed of the direct voltage to display panel 30 is stopped. Thereby, the discharge current from light modulation sheet 40 can be suppressed.

Moreover, feed of the alternating voltage is stopped when the phase of the alternating voltage is 0 degrees or 180 degrees. Stop of output of the PWM waveform (S203) is one example of stop of feed of the alternating voltage.

Thereby, the discharge current generated when turning off light modulation sheet 40 can be further suppressed. In other words, breakage of the electrodes in light modulation sheet 40 due to the discharge current can be further suppressed. Thus, display device 10 having further improved reliability can be implemented.

Moreover, light modulation sheet 40 is switchable to one or more intermediate states between the transparent state and the opaque state.

Thereby, display device 10 can control the transmittance of light modulation sheet 40 with a smaller scale. This can suppress degradation in view of the video displayed on display panel 30 and the background of display device 10 (such as (an) object(s) or scenery behind display device 10).

Moreover, light modulation sheet 40 is controlled to an intermediate state having a lower transmittance among the one or more intermediate states as an illuminance in an environment in which display device 10 is disposed increases.

Thereby, display device 10 can suppress degradation in view of the video displayed on display panel 30 and the background of display device 10, which is caused by an increase in illuminance of the environment. For example, when display device 10 is disposed outdoor or in a moving body such as an automobile or a train, degradation in view can be effectively suppressed.

Moreover, light modulation sheet 40 is controlled to an intermediate state having a lower transmittance among the one or more intermediate states as an illuminance of the object viewed through display device 10 by a viewer increases.

Thereby, display device 10 can suppress degradation in view of the video displayed on display panel 30, which is caused by an increase in illuminance of the environment.

Even in the state where one of the transparent state, the opaque state, and the one or more intermediate states is switchable to another one of the transparent state, the opaque state, and the one or more intermediate states, the PWM waveform for generating the alternating voltage having a duty cycle of 50% at a phase of the alternating voltage of 0 degrees or 180 degrees from the direct voltage may be output. The PWM waveform is output by microcomputer 81, for example.

Thereby, generation of the inrush current can be suppressed irrespective of how light modulation sheet 40 is switched, that is, even when the alternating voltage fed to light modulation sheet 40 is varied.

When the direct voltage of one intermediate state among the one or more intermediate states is lower than or equal to a predetermined voltage and switch to the one intermediate state is executable, any PWM waveform may be output. The PWM waveform is output by microcomputer 81, for example.

Thereby, generation of a large amount of inrush current can be suppressed, and thus the inrush current can be effectively suppressed.

Moreover, as described above, display device 10 according to the present embodiment is display device 10 including light modulation sheet 40 switchable between the transparent state and the opaque state. Display device 10 includes microcomputer 81 (one example of the PWM waveform outputter) which outputs a PWM waveform for generating an alternating voltage based on a direct voltage, when an operation to turn on display device 10 is obtained, the alternating voltage having a duty cycle of 50% at a phase of 0 degrees or 180 degrees; and drive circuit 82 which generates the alternating voltage from the direct voltage, based on the PWM waveform output, and outputs the alternating voltage generated to light modulation sheet 40.

This provides the same effects as those of the method of controlling display device 10 described above.

Moreover, light modulation sheet 40 includes conductive paste 46 to which the alternating voltage is fed. Conductive paste 46 has a dimension satisfying a current density of 500 mA/mm$^2$ or less.

Such a configuration controls the current density to 500 mA/mm$^2$, thus reducing locally generated heat which causes voids B. For example, even when an inrush current of about 200 mA is generated, the locally generated heat can be reduced. Thus, breakage of the electrodes in light modulation sheet 40 can be further suppressed.

For example, when the light modulation sheet included in the display device according to Comparative Example has electrode width W of 150 mm and commercial power supply P1 is directly fed to light modulation sheet 140, about 200 mA of inrush current flows. As a result, the electrodes of light modulation sheet 140 are broken after the display device according to Comparative Example is turned on and off about 500 times.

In contrast, when light modulation sheet 40 included in display device 10 according to the present embodiment has electrode width W of 460 mm and light modulation sheet 40 is turned on and off at a phase of 0 degrees or 180 degrees while the phase of the alternating voltage at 0 degrees and 180 degrees is controlled to a duty cycle of 50%, the inrush current can be reduced to about 30 mA. As a result, display device 10 according to the present embodiment can be turned on and off about 400000 times. Thus, display device 10 according to the present embodiment can drastically prolong the life of light modulation sheet 40.

Other Embodiments

Although the method for controlling a display device and the display device according to the embodiment and modifications have been described based on the embodiment and modifications (hereinafter, also referred to as embodiment and the like) as above, the embodiment and the like should not be construed as limitations to the present disclosure.

Accordingly, the components described in the accompanying drawings and the detailed description may include components essential for solving the problem but also components nonessential for solving the problem, which are intended to illustrate the above technique. For this reason, it should not be determined that those nonessential components are essential just because those nonessential components are described in the accompanying drawings and the detailed description.

For example, although an example in which the light modulation sheet is brought into the transparent state when the alternating voltage is fed and is brought into the opaque state when the alternating voltage is not fed has been described in the above embodiment and the like, any other configuration can be used. The light modulation sheet may be configured to be brought into the opaque state when the alternating voltage is fed, and to be brought into the transparent state when the alternating voltage is not fed.

Moreover, in the light modulation sheet according to the above embodiment and the like, switching between one of the transparent state and the opaque state and the intermediate state and switching between one intermediate state and another intermediate state among one or more intermediate states may be controlled according to the illuminance around the display device or a signal (video signal) input to the display device, for example. In this case, the display device may include a controller (not illustrated) which controls DC power supply P2 to output a voltage value according to the illuminance around the display device or the video signal input to the display device. For example, the controller may set the transmittance of the light modulation sheet to one of three or more predetermined transmittances by controlling the voltage value of DC power supply P2.

The controller may be communicably connected to an illuminance sensor, and may control DC power supply P2 according to the illuminance obtained from the illuminance sensor. For example, when the illuminance around the display device is the illuminance in an environment in which the display device is disposed, the controller may control the voltage value of DC power supply P2 such that the transmittance of the light modulation sheet is lower as the illuminance is higher. It can also be said that as the illuminance is higher, the controller controls the state to an intermediate state having a lower transmittance among the one or more intermediate states.

For example, when the illuminance around the display device is the illuminance of an object viewed by a viewer through the display device (e.g., an object disposed behind the display device), the controller may control the voltage value of DC power supply P2 such that the transmittance of the light modulation sheet is lower as the illuminance is higher. It can also be said that as the illuminance is higher, the controller controls the state to an intermediate state having a lower transmittance among the one or more intermediate states.

For example, the illuminance sensor may be included in the display device. The illuminance sensor is disposed to be capable of measuring the illuminance of the environment or the illuminance of the object.

Alternatively, the controller may be disposed to be capable of obtaining the video signal input to the display device, and may control DC power supply P2 according to the video signal input. For example, the controller may control the voltage value of DC power supply P2 such that the transmittance of the light modulation sheet is lower as the average luminance of an image formed by a video signal input to the display device is higher. It can also be said that controller controls the state to an intermediate state having a lower transmittance among the one or more intermediate states as the average luminance is higher.

Moreover, depending on whether the voltage value of the direct voltage of DC power supply P2 is lower than or equal to a predetermined voltage, the controller may determine whether the operations illustrated in FIGS. 10 and 11 are performed. The inrush current flowing in the light modulation sheet when feed of the electric power to the light modulation sheet is turned on tends to increase as a larger voltage is applied. The discharge current flowing in the light modulation sheet when feed of the electric power to the light modulation sheet is turned off tends to increase as a larger voltage is applied to the light modulation sheet immediately before the feed is turned off. In other words, when a lower voltage is fed to the light modulation sheet, the inrush current and the discharge current flowing are reduced. Thus, the controller may determine one of the operations illustrated in FIGS. 10 and 11 when the voltage value of the direct voltage of DC power supply P2 is lower than or equal to the predetermined voltage. The microcomputer may control the phase of the alternating voltage depending on the result of determination by the controller.

For example, when the direct voltage for one intermediate state among the one or more intermediate states is lower than or equal to a predetermined voltage and switching to the one intermediate state is executable, the microcomputer may output any PWM waveform. For example, only when the direct voltage for one intermediate state among the one or more intermediate states is lower than or equal to a predetermined voltage and switching to the one intermediate state is executable, the light modulation sheet may receive feed of the electric power from commercial power supply P1. In this case, the light modulation sheet may be connected to the commercial power supply through a switch or the like, for example. The predetermined voltage is preliminarily set.

Irrespective of the voltage value of the direct voltage of DC power supply P2, the microcomputer may control to suppress the inrush current. For example, even when one of the transparent state, the opaque state, and one or more intermediate states is switchable to another one of the transparent state, the opaque state, and the one or more intermediate states, the microcomputer may output the PWM waveform for generating an alternating voltage based on the direct voltage, the alternating voltage having a duty cycle of 50% at a phase of the alternating voltage of 0 degrees or 180 degrees.

One or a plurality of components illustrated in FIG. 5 or 8 (e.g., microcomputer and the like) may have the above function of the controller.

The reinforcing plate according to the above embodiment may have the function of the operation obtainer which receives an operation from a user. The reinforcing plate may be a touch panel, for example.

Although an example in which the frame portion according to the above embodiment surrounds surfaces other than the front surface and the rear surface has been described, the frame portion may be configured to surround surfaces other than the front surface.

An example in which the electric power based on the DC power supply is not fed to the display unit has been described in the above embodiment, but not limited thereto. The electric power may be fed to the display unit.

Applications of the display device according to the above embodiment and the like are not particularly limited, and the display device may be implemented as a television apparatus, or may be implemented as a store window.

The order of a plurality of processings described in the above embodiment is one example. The order of a plurality of processings may be changed, or the plurality of processings may be executed in parallel. Part of the plurality of processings may not be executed.

The components described in the above embodiment may be implemented as software, or may be typically implemented as LSI, which is an integrated circuit. These may be individually formed into single chips, or part or all of the components may be formed into a single chip. Although the integrated circuit is referred to as LSI here, it may be referred to as IC, system LSI, super LSI, or ultra LSI depending on the difference in integration density in some cases. Formation of the integrated circuit is not limited to LSI, and may be implemented with a dedicated circuit or a general purpose processor. A FPGA programmable after manufacturing of LSI or a reconfigurable processor enabling reconfiguration of connection or setting of circuit cells inside LSI after manufacturing of LSI may be used. Furthermore, when progression of the semiconductor techniques or another technique derived therefrom results in a technique of forming an integrated circuit which replaces LSI, naturally, integration of components may be performed using the technique.

The division of the functional block in the block diagram is one example, and a plurality of functional blocks may be implemented as one functional block, one functional block may be divided into several functional blocks, or part of the functions may be transferred to another functional block. Moreover, in a plurality of functional blocks having similar functions, such functions may be processed by a single piece of hardware or software in parallel or in a time-sharing manner.

Moreover, in the embodiment, the components may each be configured with dedicated hardware, or may be implemented by executing a software program suitable for the component. The components may be implemented by a program executor, such as a CPU or a processor, which reads out and executes a software program recorded on a hard disk or a recording medium such as a semiconductor memory.

Besides, the present disclosure also covers embodiments obtained from the embodiment and modifications subjected to a variety of modifications conceived by persons skilled in the art, or embodiments implemented with any combination of the components and the functions in the present disclosure without departing from the gist of the embodiment.

INDUSTRIAL APPLICABILITY

The present disclosure is effective to display devices including light modulation sheets.

REFERENCE SIGNS LIST 10 display device
20 reinforcing plate
30 display panel
40, 140 light modulation sheet
41, 43 substrate
42 light modulation layer
44, 45 ITO film
46 conductive paste
47 sealing tape
50 frame portion
60 operation obtainer
70 first power supply circuit
80 second power supply circuit
81 microcomputer
82 drive circuit
90 conductive tape
B void
C capacitor
E direct voltage
L inductor
P1 commercial power supply
P2 DC power supply
Q1, Q2, Q3, Q4 transistor
Vout1 output voltage
Vout2 output voltage (alternating voltage)
W electrode width

The invention claimed is:

1. A method for controlling a display device including a light modulation sheet switchable between a transparent state and an opaque state, the method comprising:
outputting a pulse width modulation (PWM) waveform for generating an alternating voltage based on a direct voltage, when obtaining a first operation to turn on the display device, the alternating voltage having a duty cycle of 50% at a phase of 0 degrees or 180 degrees;
generating the alternating voltage from the direct voltage based on the PWM waveform output; and
outputting the alternating voltage generated to the light modulation sheet, wherein:
the light modulation sheet is switchable to one or more intermediate states between the transparent state and the opaque state, and
when the direct voltage for one intermediate state among the one or more intermediate states is lower than or equal to a predetermined voltage and switch to the one intermediate state is executable, any PWM waveform is output.

2. The method for controlling the display device according to claim 1,
wherein the display device includes a microcomputer which controls the alternating voltage output to the light modulation sheet, and
the PWM waveform is output from the microcomputer.

3. The method for controlling the display device according to claim 1,
wherein the display device includes a display panel transparent to light, the display panel being disposed to be overlaid on the light modulation sheet, and
feed of a voltage to the display panel is started in response to the first operation, and thereafter feed of the alternating voltage to the light modulation sheet is started in response to the first operation.

4. The method for controlling the display device according to claim 3,
wherein when a second operation to turn off the display device is obtained, feed of the voltage to the display panel is stopped in response to the second operation, and thereafter feed of the alternating voltage to the light modulation sheet is stopped in response to the second operation.

5. The method for controlling the display device according to claim 4,
wherein feed of the alternating voltage is stopped when the phase of the alternating voltage is 0 degrees or 180 degrees.

6. The method for controlling the display device according to claim 1,
wherein the light modulation sheet is controlled to an intermediate state having a lower transmittance among the one or more intermediate states as an illuminance in an environment in which the display device is disposed increases.

7. The method for controlling the display device according to claim 1,
wherein the light modulation sheet is controlled to an intermediate state having a lower transmittance among the one or more intermediate states as an illuminance of an object viewed by a viewer through the display device increases.

8. The method for controlling the display device according to claim 1,
wherein even when one of the transparent state, the opaque state, and the one or more intermediate states is switchable to another one of the transparent state, the opaque state, and the one or more intermediate states, the PWM waveform for generating the alternating voltage based on the direct voltage is output, the alternating voltage having a duty cycle of 50% at a phase of 0 degrees or 180 degrees.

9. A display device comprising:
a light modulation sheet switchable between a transparent state and an opaque state;
a microcomputer which outputs a PWM waveform for generating an alternating voltage based on a direct voltage when obtaining an operation to turn on the display device, the alternating voltage having a duty cycle of 50% at a phase of 0 degrees or 180 degrees; and
a drive circuit which generates the alternating voltage from the direct voltage based on the PWM waveform output, and outputs the alternating voltage generated to the light modulation sheet, wherein:
the light modulation sheet is configured to be switchable to one or more intermediate states between the transparent state and the opaque state, and
the microcomputer is configured to output, when the direct voltage for one intermediate state among the one or more intermediate states is lower than or equal to a predetermined voltage and switch to the one intermediate state is executable, any PWM waveform.

10. The display device according to claim 9,
wherein the light modulation sheet includes an electrode which receives feed of the alternating voltage, and
the electrode has a dimension satisfying a current density of 500 mA/mm² or less.

\* \* \* \* \*